United States Patent [19]

Muraoka et al.

[11] Patent Number: 4,938,503
[45] Date of Patent: Jul. 3, 1990

[54] AIR BAG

[75] Inventors: Tsutomu Muraoka; Hiroaki Shinto, both of Aichi, Japan

[73] Assignee: Kabushiki Kaisha Tokai-Rika-Denki-Seisakusho, Aichi, Japan

[21] Appl. No.: 310,653

[22] Filed: Feb. 15, 1989

[30] Foreign Application Priority Data

Feb. 18, 1988 [JP] Japan .............................. 63-20402[U]

[51] Int. Cl.$^5$ ............................................. B60R 21/16
[52] U.S. Cl. ..................................... 280/731; 280/732
[58] Field of Search ................ 280/728, 730, 731, 732

[56] References Cited

U.S. PATENT DOCUMENTS

| | | | |
|---|---|---|---|
| 3,945,665 | 3/1976 | Tsutsumi et al. | 280/731 |
| 4,334,699 | 6/1982 | Patzelt et al. | 280/731 |
| 4,785,144 | 11/1988 | Fosnaugh et al. | 280/731 |

Primary Examiner—Kenneth R. Rice
Attorney, Agent, or Firm—Sixbey, Friedman, Leedom & Ferguson

[57] ABSTRACT

An air bag includes a base plate, and a cover, together with the base plate, forming a bag accommodating space. The air bag is mounted on a vehicle by passing bolts through the base plate into the bag accommodating space and threading them with nuts fixed to the side of the base plate located in the bag accommodating space. The nuts are covered by caps so as to prevent damage to a bag accommodated in the bag accommodating space.

20 Claims, 3 Drawing Sheets

AIR BAG

BACKGROUND OF THE INVENTION

1. Field of the Invention:

The present invention relates to an air bag mounted on, for example, a steering wheel of an automobile.

2. Description of the Related Art:

Air bags of the type mounted on a steering wheel so that a bag is inflated between the steering wheel and a seat occupant when the speed of a vehicle is rapidly reduced are known.

In the above-described air bag, the bag is mounted on a base plate in a folded state. Normally, the bag is covered by a cover, and is accommodated in a space formed between the cover and the base plate. Supporting plates are mounted on the base plate by bolts and nuts, and the base plate is supported on the steering wheel through these supporting plates.

However, in this type of conventional air bag, the supporting plates are often fixed to the base plate by threading the bolts with nuts which are welded to the surface of the base plate that is located on the bag mounted side. In this case, the bag must be very strong so that it is not damaged when the nuts make contact with the bag.

SUMMARY OF THE INVENTION

An object of the present invention is to provide an air bag in which the mounting means, such as bolts and nuts, does not make contact with the bag so that damage to the bag is prevented.

To this end, the present invention provides an air bag which comprises a base plate, a cover mounted on the base plate for forming a bag accommodating space, a mounting means with which the base plate is mounted on a vehicle, part of the mounting means protruding into the bag accommodating space, and a cap for covering the protruding portion of the mounting means into the bag accommodating space.

In the present invention, the protruding portion of the mounting means which protrudes into the bag accommodating space is covered by a cap so that it does not make contact with the bag. The cap can be in any form, so long as a corner portion thereof that makes contact with the bag is not sharp.. In consequence, the bag does not make direct contact with nuts, and damage to the bag can be therefore prevented.

DESCRIPTION OF THE PREFERRED EMBODIMENTS

An embodiment of the present invention will be described below with reference to FIGS. 1 to 3.

Figure 1:
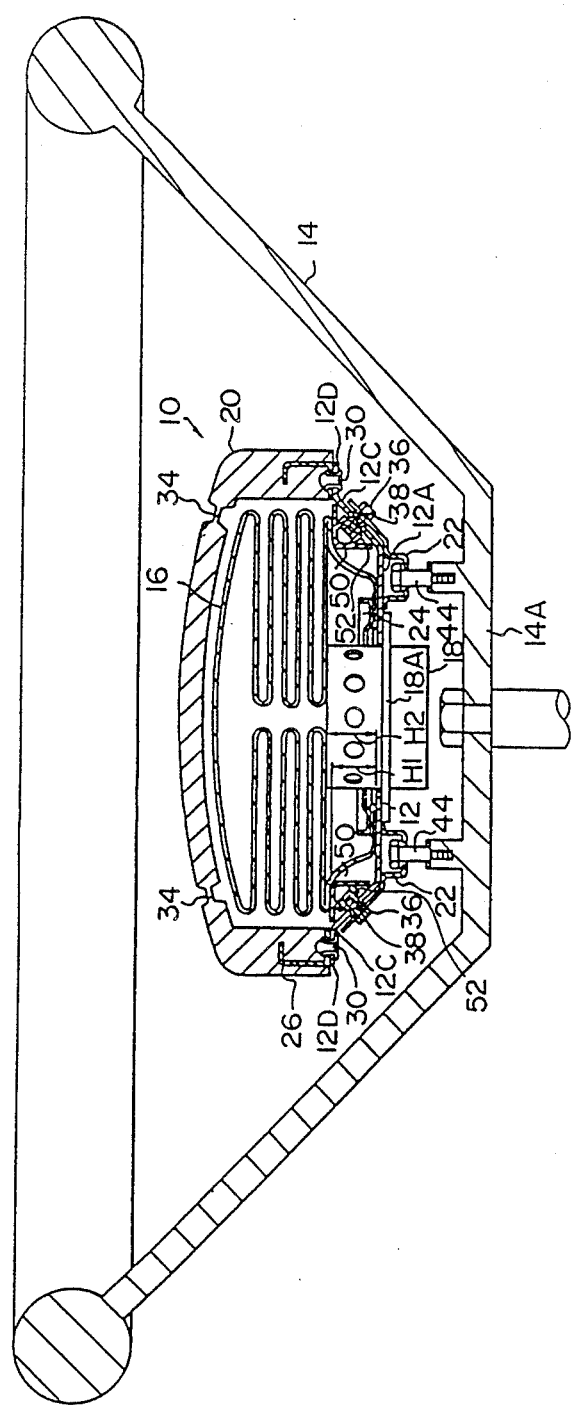
FIG. 1 is a cross-section showing a state wherein an air bag according to the present invention is mounted on a steering wheel.

In FIG. 1, an air bag 10 has a base plate 12 which is supported parallel to a hub 14A of a steering wheel 14.

Figure 2:
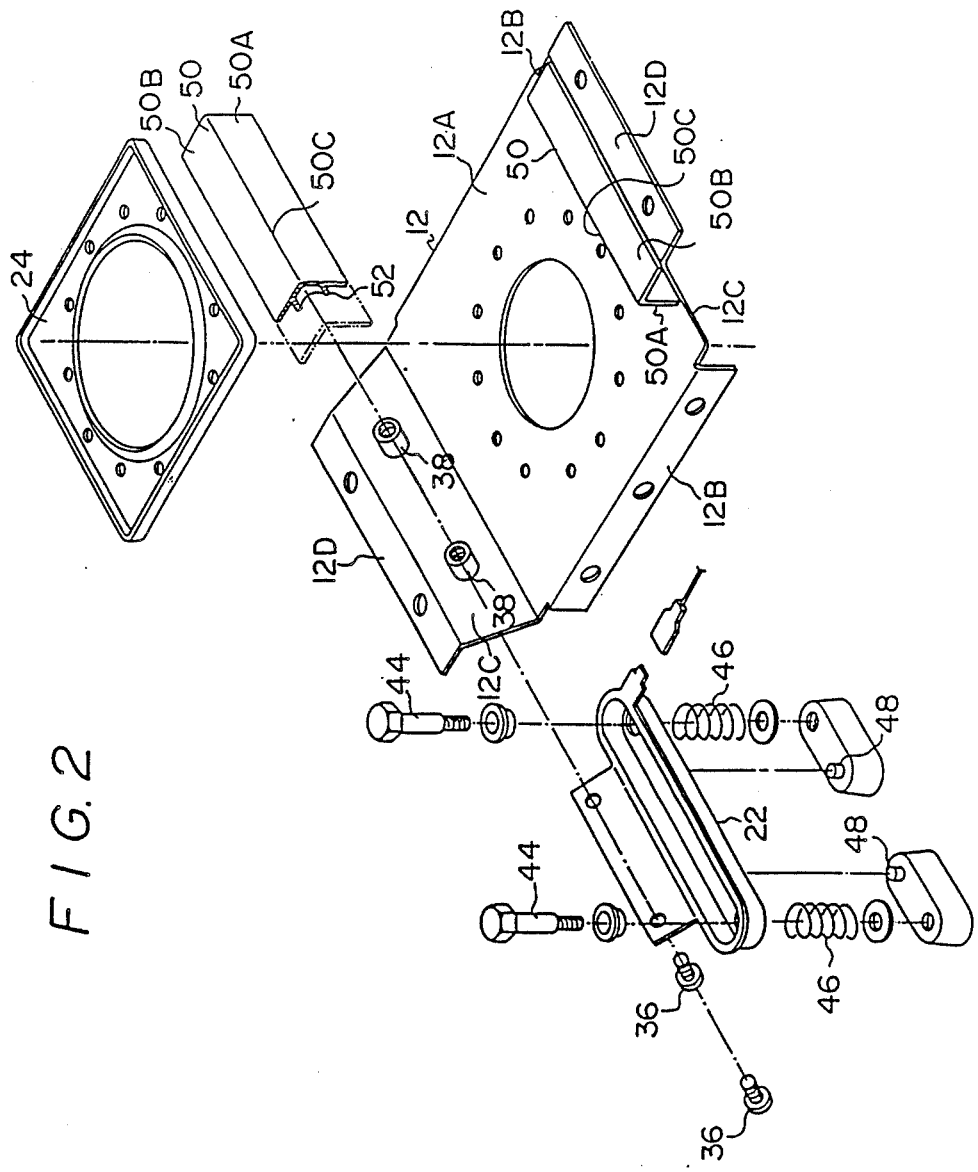
FIG. 2 is an exploded perspective view of the essential parts of the air bag of FIG. 1.

The base plate 12 has a base portion 12A, and a pair of flanges 12B which are formed in opposed relation to each other and are substantially perpendicular to the base portion 12A, as shown in FIG. 2. These flanges 12B form protruding portions that protrude in a direction away from a seat occupant (in the downward direction as viewed in FIG. 1). The base plate 12 also has a pair of inclined portions 12C at the sides on which the flanges 12B are not formed, and a pair of flanges 12D which are formed integrally with the inclined portions 12C parallel to the base portion 12A. The flanges 12D form a protruding portion that protrudes toward the seat occupant (in the upward direction as viewed in FIG. 1). The inclined portions 12C are inclined at an obtuse angle to the base portion 12A and in the opposite directions.

On base plate 12 are mounted a bag 16, an inflater 18, a cover 20, and supporting plates 22 which serve as supporting members.

The bag 16 is disposed in a folded state on the side of the base plate 12 which is closer to the seat occupant (on the upper side as viewed in FIG. 1). The open edge of the bag 16 is mounted on the substantially center portion of the base portion 12A of the base plate 12 through a ring plate 24. The ring plate 24 is mounted on the base portion 12A of the base plate 12 by rivets (not shown), whereby the open edge of the bag 16 is pressed against the base portion 12A.

The inflater 18 has a cylindrical form. It passes through the substantially..center portion of the base portion 12A of the base plate 12, with one end portion thereof being inserted into the bag 16. The inflater 18 has a flange 18A on the outer periphery thereof. The flange 18A is fixed to the surface of the base portion 12A away from the seat occupant (on the lower side as viewed in FIG. 1) by bolts (not shown).

The inflater 18 is operated by an acceleration sensor so as to inflate the bag 16 with gas (not shown) when the speed of a vehicle is rapidly decreased.

The cover 20 is disposed on the side of the base plate 12 closer to the seat occupant (on the upper side as viewed in FIG. 1) so as to form space in which the bag 16 is accommodated with the aid of the base plate 12. A flange-like core 26 is buried in the peripheral portion of the cover 20 so as to reinforce it. The core 26 is fixed to the flanges 12B and 12D of the base plate 12 by rivets 30, by which the cover 20 is supported on the base plate 12.

Figure 3:
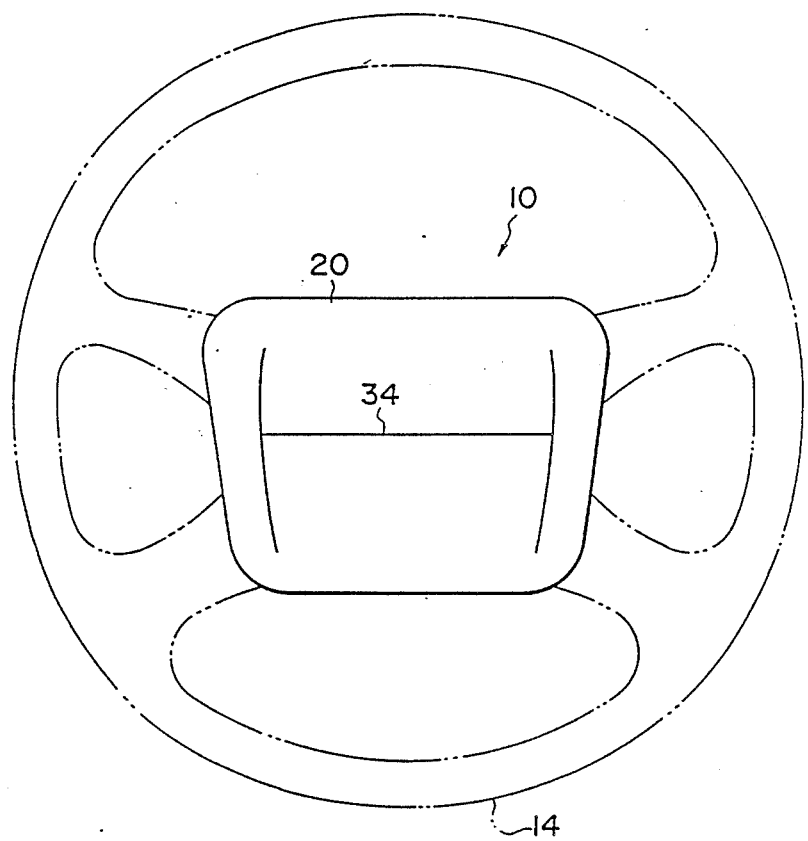
FIG. 3 is a front view showing the arrangement of the air bag of FIG. 1 on the steering wheel.

The cover 20 has thin wall portions 34, as shown in FIG. 3, which break when the bag 16 is inflated.

The supporting plates 22 are disposed between the base plate 12 and the hub 14A of the steering wheel 14. The supporting plates 22 are respectively provided on the two sides of the inflater 18 at positions where they face the inclined portions 12C of the base plate 12. The supporting plates 22 are respectively fixed to the inclined portions 12C of the base plate 12 at four positions by bolts 36 and nuts 38 which serve as mounting means. Further, the supporting plates 22 are supported on the hub 14A by shoulder bolts 44 in such a manner as to be movable away from and toward the hub 14A. A compression coil spring 46 (shown in FIG. 2) is wound around each of the shoulder bolts 44 so as to always urge the supPorting plate 22 away from the hub 14A, by which the supporting plate 22 is held at a position separated from the hub 14A . When the supporting plates 22 are pressed against the urging forces of the compression coil springs 46, they make contact with fixed electrodes 48 (shown in FIG. 2) protruding from the hub 14A. The supporting plates 22 and the fixed electrodes 48 in combination form switches for a horn (not shown).

The fixing of these supporting plates 22 to the base plate 12 will be next described in detail. The nuts 38 are welded to the surface of each of the inclined portions 12C closer to the seat occupant (on the upper side as viewed in FIG. 1), and the supporting plate 22 is fixed to the corresponding inclined portion 12C of the base plate 12 by threading the bolts 38 with the nuts 38. In other words, the nuts 38 protrude into the bag accommodating space from the base plate 12. The nuts 38 are covered by a cap 50 so that they do not make direct contact with the bag 16.

The caps 50 are respectively provided on the two sides of the inflater 18 at positions where they face the corresponding inclined portions 12C of the base plate 12. Each of the caps 50 is in the form of a plate, and has a substantially L-shaped cross-section, as shown in FIG. 2. The cap 50 has a first plane portion 50A, and a second plane portion 50B. In order to cover the nuts 38, the cap 50 is disposed in such a manner that the first plane portion 50A is located in the vicinity of the connected portion of the base portion 12A and the inclined portion 12C is substantially perpendicular to the base portion 12A. Furthermore, the second plane portion 50B is disposed substantially parallel to the base portion 12A and faces the inclined portion 12B. The cap 50 has a cylindrical portion 52 formed in the vicinity of a corner thereof, that is, in the vicinity of the connected portion of the first and second end portions 50A and 50B, as shown in FIG. 2. The cylindrical portion 52 is fitted on the nuts 38 so that the cap 50 is not shifted from its position. The cylindrical portion 52 may be of any form, so long as it enables the cylindrical portion to be fitted on the nuts 38. For example, if the nuts 38 have a rectangular or hexagonal form, the cylindrical portion 52 has a form corresponding to the form of the nuts 38. A bent portion 50C of the cap 50 has a large radius of curvature so that it does not damage the bag 16 when it makes contact with the bag 16.

In this embodiment, the length H1 (shown in FIG. 1) of the portion of the cap 50 which protrudes into the bag accommodating space is substantially equal to the length H2 (shown in FIG. 1) of the portion of the inflater 18 which protrudes into the bag accommodating space. The bag 16 is accommodated between the base plate 12 and the cover 20 around the protruding portion of the inflater at a substantially uniform density.

The operation of this embodiment will be described next.

Normally, the bag 16 of the air bag 10 is accommodated within the cover 20 in a folded state, and acts as a switch for a car horn (not shown). More specifically, when a driver is to blow a horn, he or she presses the cover 20, and this brings the supporting plates 22 into contact with the fixed electrodes 48 against the urging forces of the compression coil springs 46.

On the other hand, when the speed of the vehicle is rapidly decreased, an acceleration sensor (not shown) activates the inflater 18 which inflates the bag 16 with gas. The inflated bag 16 breaks the thin wall portions 34 of the cover 20, and protrudes from the cover 20 so that it is interposed between the seat occupant and the steering wheel 14.

In the air bag 10, since the nuts 38 which.. protrude into the bag accommodating portion are covered by the caps 50, the bag 16 does not make direct contact with the nuts 38 during the normal operation of the air bag nor when vehicle speed is rapidly decreased, and therefore is not damaged. The caps 50 are in a plate-like form, and have a substantially L-shaped form. Further, since the bent portion 50C of each of the caps 50 has a large radius of curvature, it does not damage the bag 16 when it makes contact with it.

In this embodiment, the length H1 (shown in FIG. 1) of the portion of the cap 50 which protrudes into the bag accommodating space is made substantially equal to the length H2 (shown in FIG. 1) of the portion of the inflater 18 which protrudes into the bag accommodating space. Further, the bag 16 is accommodated between the base plate 12 and the cover 20 around the protruding portion of the inflater at a substantially uniform density. In consequence, when the cover 20 is pressed (when the car horn is operated), a uniform load can be applied to the cover.

What is claimed is:

1. An improved inflatable air bag assembly of the type having:
   a base plate;
   an air bag mounted onto said plate;
   a cover mounted on said base plate for defining a space between said base plate and said cover that accommodates said air bag, and
   mounting means with which said base plate is mounted on a vehicle, part of said mounting means protruding into said bag accommodating space, wherein the improvement comprises
   a cap for covering said portion of said mounting means that protrudes into said bag accommodating space and for protecting said air bag from the localized forces that said protruding part of said mounting means would otherwise apply to said bag when said bag is inflated.

2. An air bag assembly according to claim 1, wherein said mounting means comprises:
   a nut fixed to an inside of said base plate located in said bag accommodating space, said nut protruding into said bag accommodating space; and
   a bolt passing through said base plate into said bag accommodating space from an outside of said base plate, and threading with said nut.

3. An air bag assembly according to claim 2, wherein said cap comprises:
   a cylindrical portion surrounding said nut.

4. An air bag assembly according to claim 1, wherein said cap comprises:
   a curved portion which prevents damage to said bag accommodated in said bag accommodating space when said bag is inflated.

5. An air bag assembly according to claim 1, wherein said mounting means comprises:
   a nut fixed to the side of said base plate located in said bag accommodating space, said nut protruding into said bag accommodating space;
   a supporting plate mounted on a steering wheel of a vehicle in such a manner as to be movable;
   a spring for always urging said supporting plate away from said steering wheel; and
   a bolt passing through said supporting plate and said base plate into said bag accommodating space from the other side of said base plate, and threading with said nut so as to couple said supporting plate to said base plate.

6. An air bag assembly according to claim 5, further comprising:
   a fixed electrode fixed to said steering wheel, said fixed electrode, together with said supporting plate, forming a switch for a car horn.

7. An improved air bag assembly comprising:
a base plate having a base portion and a pair of inclined portions which are inclined at an obtuse angle to said base portion in opposite directions;
a cover mounted in such a manner as to extend between the end portions of said inclined portions, said cover forming a space between said base plate and said cover that accommodates said bag
mounting means with which said base plate is mounted on a vehicle, part of said mounting means having protruding portions which protrude into said bag accommodating space; and
caps for covering said protruding portions of said mounting means and for protecting said air bag from the localized forces that said protruding part of said mounting means would otherwise apply to said bag when said bag is inflated, wherein said caps include plate members and attaching portions for attaching said plate members to said protruding portions.

8. An air bag assembly according to claim 7, wherein said mounting means comprises:
nuts fixed to the sides of said inclined portions located in said bag accommodating space, said nuts protruding into said bag accommodating space; and
bolts passing through said inclined portions into said bag accommodating space from the other side of said inclined portions and threading with said nuts.

9. An air bag assembly according to claim 7, wherein each of said
plate members has a substantially L-shaped cross-sectional form, said plate member further having a first plate portion, and a second plane portion which is substantially perpendicular to said first plane portion; and wherein each of said attaching portions includes
a cylindrical portion fixed to said plate member for fitting said plate member on said protruding portion of said mounting means such that said first plane portion is substantially perpendicular to said base portion and such that said second plane portion is substantially parallel to said base portion.

10. An air bag assembly according to claim 9, wherein said plate member has an arcuate portion having an arcuate cross-section between said first and second plane portions.

11. An air bag assembly according to claim 9, wherein the length of said first plane portion from said base portion is made substantially equal to the length of the portion of an inflater which passes through said base portion into said bag accommodating space.

12. An air bag assembly according to claim 9, wherein said mounting means comprises:
nuts fixed to the side of said base plate located in said bag accommodating space, said nuts protruding into said bag accommodating space;
supporting plates mounted on a steering wheel of a vehicle in such a manner as to be movable;
springs for always urging said supporting plates away from said steering wheel; and
bolts passing through said supporting plates and said base plate into said bag accommodating space from the other side of said base plate, and threading with said nuts so as to couple said supporting plates to said base plate.

13. An air bag assembly according to claim 9, further comprising:

fixed electrodes fixed to said steering wheel, said fixed electrodes, together with said supporting plates, forming a switch for a car horn.

14. An air bag, comprising:
a base plate having a base portion and a pair of inclined portions which are inclined at an obtuse angle to said base portion in opposite directions;
a cover mounted in such a manner as to extend between said inclined portions, said cover forming a bag accommodating portion between said base plate and said cover;
nuts fixed to the sides of said inclined portions located in said bag accommodating space, said nuts protruding into said bag accommodating space;
supporting plates mounted on a steering wheel of a vehicle in such a manner as to be movable;
springs for always urging said supporting plates away from said steering wheel;
bolts passing through said supporting plates and said inclined portions of said base plate into said bag accommodating space from the other side of said supporting plates and said inclined portions, and threading with said nuts so as to couple said supporting plates to said base plate;
caps, each of which having a first plane portion, and a second plane portion which is substantially perpendicular to said first plane portion, said cap being covered over said nuts in such a way that said first plane portion is substantially perpendicular to said base portion and such that said second plane portion is substantially parallel to said base portion;
an inflater fixed to said base plate, one end portion of said inflater passing through said base portion and protruding into said bag accommodating space; and
a bag having an opening into which said one end portion of said inflater protruding into said bag accommodating space is inserted, the open edge of said bag being fixed to said base plate, said bag being accommodated in said bag accommodating space in a folded state.

15. An air bag assembly according to claim 14, further comprising:
fixed electrodes fixed to said steering wheel, said fixed electrodes, together with said supporting plates, forming a switch for a car horn.

16. An air bag assembly according to claim 14, wherein the length of said first plane portion of each of said caps from said base portion is made substantially equal to the length of the portion of said inflater which protrudes into said bag accommodating space.

17. An air bag assembly according to claim 14, wherein said bag is accommodated in such a way that the folded portion thereof makes contact with said second plane portions of said caps and the end surface of said protruding portion of said inflater which protrudes into said bag accommodating space.

18. An air bag assembly comprising:
a base plate;
an air bag mounted onto said plate;
a cover mounted on said base plate for defining a space between said base plate and said cover for accommodating said bag;
mounting means with which said base plate is mounted on a vehicle, part of said mounting means having a protruding portion which protrudes into said bag accommodating space; and a cap for covering said protruding portion of said mounting means and for protecting said bag, said cap including a plate member and an attaching portion for attaching said plate member to said protruding portion.

19. An air bag assembly according to claim 18, wherein said attaching portion comprises:
a cylindrical portion fitted on said nut.

20. An air bag assembly according to claim 19, wherein said plate member comprises:
a curved portion which prevents damage to said bag in said accommodating space.

* * * * *

UNITED STATES PATENT AND TRADEMARK OFFICE
CERTIFICATE OF CORRECTION

PATENT NO. : 4,938,503

DATED : July 3, 1990

INVENTOR(S) : Tsutomu Muraoka; Hiroaki Shinto

It is certified that error appears in the above-identified patent and that said Letters Patent is hereby corrected as shown below:

On the title page;

IN THE ASSIGNMENT:

The following Assignment information should be substituted for that appearing on the cover page of the original patent.

[73]   Assignee:   Kabushiki Kaisha
Tokai-Rika-Denki-Seisakusho, Aichi-ken, Japan; and
Toyota Jidosha Kabushiki Kaisha,
Aichi-ken, Japan Signed and Sealed this Fourth Day of December, 1990

Attest:

HARRY F. MANBECK, JR.

*Attesting Officer*      *Commissioner of Patents and Trademarks*